United States Patent [19]

Wilmers

[11] 4,437,644

[45] Mar. 20, 1984

[54] ELECTRICALLY OPERABLE VALVE

[75] Inventor: Gottlieb Wilmers, Neuenstadt, Fed. Rep. of Germany

[73] Assignee: Audi NSU Auto Union Aktiengesellschaft, Fed. Rep. of Germany

[21] Appl. No.: 173,406

[22] Filed: Jul. 29, 1980

[30] Foreign Application Priority Data

Aug. 6, 1979 [DE] Fed. Rep. of Germany ....... 2931874

[51] Int. Cl.³ ............................................ F16K 31/04

[52] U.S. Cl. ...................................... 251/11; 239/584; 123/472

[58] Field of Search .................. 251/11, 129; 123/472; 239/584, 585

[56] References Cited

U.S. PATENT DOCUMENTS 3,055,631 9/1962 Kippenhan .......................... 251/129
3,211,414 10/1965 Webb .................................... 251/11
3,537,678 11/1970 Shmueli ................................ 251/11
3,540,479 11/1970 Thompson ........................ 251/11 X
3,614,486 10/1971 Smiley ............................ 251/129 X
4,022,166 5/1977 Bart ................................. 123/472 X
4,158,368 6/1979 Clark ............................... 251/129 X

*Primary Examiner*—Arnold Rosenthal
*Attorney, Agent, or Firm*—Kane, Dalsimer, Kane, Sullivan and Kurucz

[57] ABSTRACT

This invention relates to electrically operable valves and in particular, but not exclusively, to valves for use in fuel injection system for internal combustion engines. A valve has a housing 13 having a valve 3 seat, and receiving a valve body 2 which can be raised from the valve seat 3 in accordance with a variation in dimension of magnetostrictional device 7 or a piezoceramic device caused by a current flow in the device. The valve body 2 is spring-loaded, by spring 15, in a sense to close the valve and is connected via the device 7 to a movable abutment unit 10,11, which is so constituted that, during the current induced variations in dimension, it acts as a stationary abutment or anchorage for that end of the device, which is remote from the valve body.

3 Claims, 3 Drawing Figures

ELECTRICALLY OPERABLE VALVE

BACKGROUND OF THE INVENTION

The invention relates to an electrically operable valve, and particularly, but not exclusively, to such valves for use in fuel injection systems for internal combustion engines.

In many fields of technology there exists the problem of supplying very small but variable quantities of fluid. For this purpose, electromagnetically operated valves of the type in which the cross-section of the orifice is constant, and in which the quantity of fluid passing through is determined by the length of time it is open, are generally used. In the case of fuel injection systems for internal combustion engines, for example, such valves are located in the fuel feed line or even constructed as injection valves. Electromagnetic valves, however, have a long response time so that they can only obey in a delayed manner the instructions of an electromagnetic control appliance, which determines the quantity injected in dependence upon engine parameters and environmental parameters. With sharply varying load states such as occur, for example, in motor vehicles, in particular, optimal running of the engine is not guaranteed.

Valves with considerably shorter switching times and correspondingly low inertia can be manufactured with the aid of piezoceramic or magnetostrictional devices, which are connected to the valve body and contract almost without any delay when current flows through them and thereby likewise produce an almost unretarded raising of the valve body from its seat. The switching time of such valves is approximately 0.05 to 0.1 ms in contrast to electromagnetically operated valves, in which the switching time is at least 1 ms. However valves incorporating magnetostrictional or piezoceramic devices have up to now not proved to be practical because their valve lift is only of the order of 20 μm (micron). This means that variations in temperature, wear and manufacturing tolerances can influence the effective valve lift and with it, have a lasting influence on the quantity of fluid dispensed by the valve.

SUMMARY OF THE INVENTION

The object of the invention is to at least reduce the influence of fluctuations in temperature, wear and manufacturing tolerances on the valve lift in electromechanical valves of this type.

According to the invention there is provided an electrically operable valve having a housing defining a valve seat and into which a valve body is inserted such that it can be raised from the valve seat against spring force in accordance with a variation in dimension of a magnetostrictional or piezoceramic device caused by a current flow in the device wherein the valve body is connected via the device to a movable abutment which is spring loaded in a sense to close the valve and which is so constituted that, during the current induced variations in dimension, it acts as a stationary abutment or anchorage for that end of the device, which is remote from the valve body.

The valve body is pressed by the spring onto the valve seat independently of any temperature fluctuations, manufacturing tolerances or wear between the valve body and valve seat. If current now flows through the device, the movable abutment, because of its inertia during the extremely brief switching time, remains stationary so that the valve lift provided for the construction is always obtained to its full extent.

If the movable abutment was not present the valve body would not be raised from its seat, when current flows through the device varying a dimension of it, and only a slight reduction of the prestress would occur as a result of the variation in dimension. Preferably said device is an elongated element the length of which is varied when current flows therethrough.

In a preferred embodiment the mass of at least part of the abutment can be such that because of its inertia it can follow only slow variations in the length of the device such as occur as a result of wear or fluctuations in temperature. With rapid variations in length such as occur when current flows through, the abutment remains at rest. It is advantageous to include in the abutment unit a hydraulic dampening device, in which case a hydraulic damper piston, which is located in a damper chamber which is situated in a housing and is filled with fluid, is provided. In order to obtain easy sealing of the damper chamber in relation to the space in which the device and the valve body are located, the damper piston can be connected via a piston rod to the device, the piston rod being sealed in relation to the housing by a disc which, on the one hand, is seated with a sliding fit on the piston rod, and on the other hand, rests slidably against a surface on the housing located at right angles to the direction of movement. This arrangement preferably avoids double centerings.

The invention may be performed in various ways specific examples of which and possible modifications thereof will now be described, by way of example, with reference to the accompanying drawings, in which:

DETAILED DESCRIPTION

Figure 1:
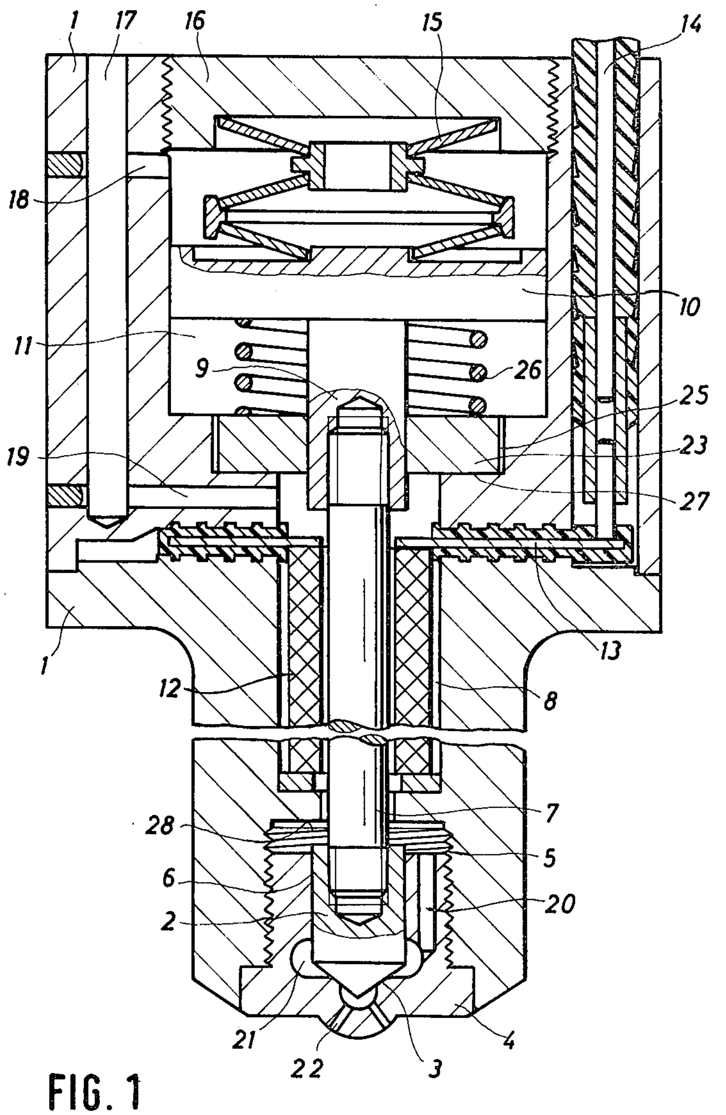
FIG. 1 is a longitudinal section of an injection valve in accordance with the invention.

FIG. 1 shows a valve housing 1 which accepts a valve body 2 to co-operate with a valve seat 3. The valve seat 3 is formed on a case 4, which is screwed, by means of a thread 5, into the open bottom end of the housing 1. The valve body 2 is mounted so as to be longitudinally movable in a bore 6 defined by the case 4 and is fixed to the bottom end of a magnetostrictional rod 7, which extends upwards through a cavity 8 extending axially in the housing 1. The rod 7 is fastened by its top end to the piston rod 9 of a damper piston 10, which is located in a damper cylinder 11, which is formed in the housing 1, for longitudinal movement. The rod 7 is surrounded, over a part of its length, by an electrical coil 12, the bottom end of which is in electrical contact with the housing 1, whilst its top end is connected via a contact plate 13 to an electrical connection 14. A cup spring 15, which is supported between a cover 16 screwed into the upper end of the housing 1 and the damper piston 10, acts in a sense to press the valve body 2 onto the valve seat 3. A fuel inflow duct 17 is provided in the housing 1 and is connected by a branch 18 to the damper chamber 11 and by a cross-duct 19 to the cavity 8. This cavity 8 is connected via a bore 20 to an annular space 21 in the case 4, upstream of the valve seat 3. The case 4 has one or more jet holes 22 disposed downstream of the valve seat.

In order to seal the damper chamber 11 from the cavity 8, a disc 23 is provided which is seated so as to have lateral play in an extension 25 of the damper chamber 11 and so as to be a sliding fit on the piston rod 9. This disc 23 is pressed against an annular shoulder 27 of the housing 1 by a spring 26 disposed between the disc 23 and the damper piston 10.

As has been previously mentioned, the valve body 2 is pressed onto its seat 3 by the spring 15. If electric current is passed through the coil 12, a sudden brief contraction of the rod 7 takes place. The mass of the damper piston 10 and the damping action of the fuel in the chamber 11 serve to maintain the piston 10 at rest against the action of spring 15 during the brief period of contraction of rod 7 and hence the rod 7 is not pressed downwardly. Consequently, the valve body 2 is raised from is seat 3 and the fuel can emerge through the jet holes 22. The very short electrical impulses of less than 1 ms for exciting the coil 12 are generated by a known unillustrated control appliance in accordance with engine and environmental parameters. The lift of the valve body 2 can be limited by a mechanical stop 28 or by the length of the electrical signal. When the coil 12 is de-energized, the spring 15 presses the valve body 2 back onto its seat 3. The contraction of the rod 7 when current flows through the coil 12 is very slight and amounts only to about 20 μm. As on the one hand, the valve body 2 is constantly pressed onto its valve seat 3 by the spring 15 in the rest state independently of variable heat expansion of the housing 1 and of the unit composed of the valve body 2, the rod 7 and the damper piston 10, and on the other hand, the damper piston 10 holds the top end of the rod 7 fixed on its rest position when the coil 12 is energized, the valve lift or opening is fully available independent of temperature influences, manufacturing tolerances or wear between the valve body and the valve seat. An exact and reproducible injection quantity is thereby guaranteed.

The sealing of the damper chamber 11 with the aid of the disc 23 avoids double centerings, as this disc 23 is located in the extension 25 of the damper chamber 11 so as to have radial play, as previously mentioned. This disc 23 also acts as a return valve when the dampening system is filled.

Figure 2:
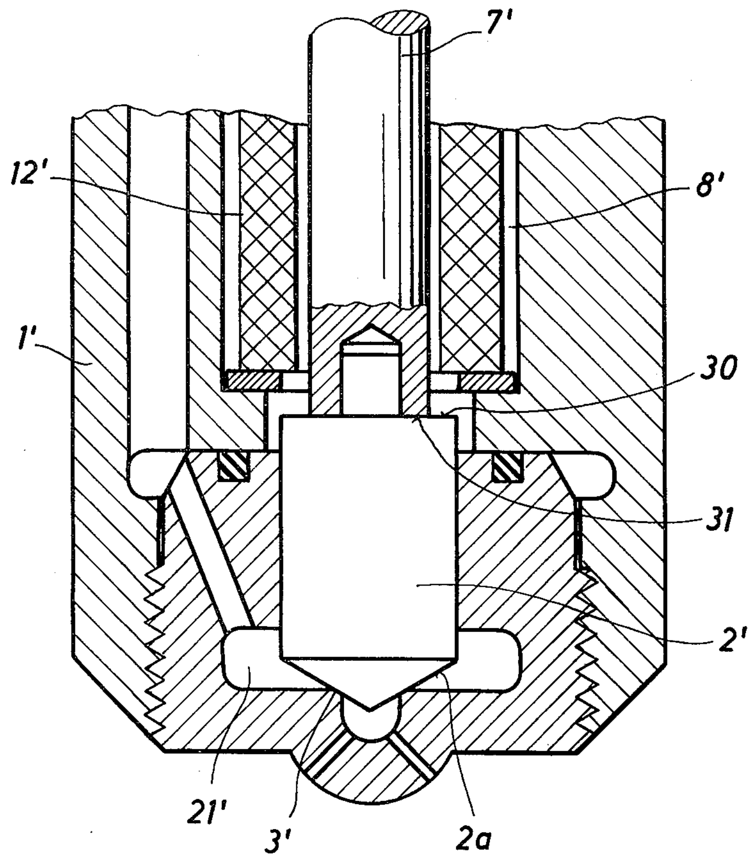
FIG. 2 shows a modification of the design of FIG. 1.

Whereas in the FIG. 1 embodiment the valve body 2 is rigidly connected to the rod 7, in FIG. 2 the valve body 2' is positively connected to the rod 7' in the closing direction only, by the abutment of its upper face 30 against the bottom end 31 of the rod 7'. When current flows through the coil 12', the rod 7' contracts as previously described, and the valve body 2' is raised from its valve seat 3' by the pressure of the fuel contained in the chamber 21' which acts on the seating surfaces 2a of valve body 2', and hence injection can take place. In this arrangement the cavity 8' in the housing 1' does not contain fuel under pressure, but it absorbs the leakage fluid which flows away from the damper chamber. To this end, a return line is connected to the cavity 8'. The advantage of this arrangement can be seen in the fact that no tractional connections have to be provided between the valve body 2' and the damper piston, but rather the valve body 2' is forced away from its valve seat 3' through the fuel pressure in the chamber 21', after it has been released by upward shrinkage of the rod 7'.

Figure 3:
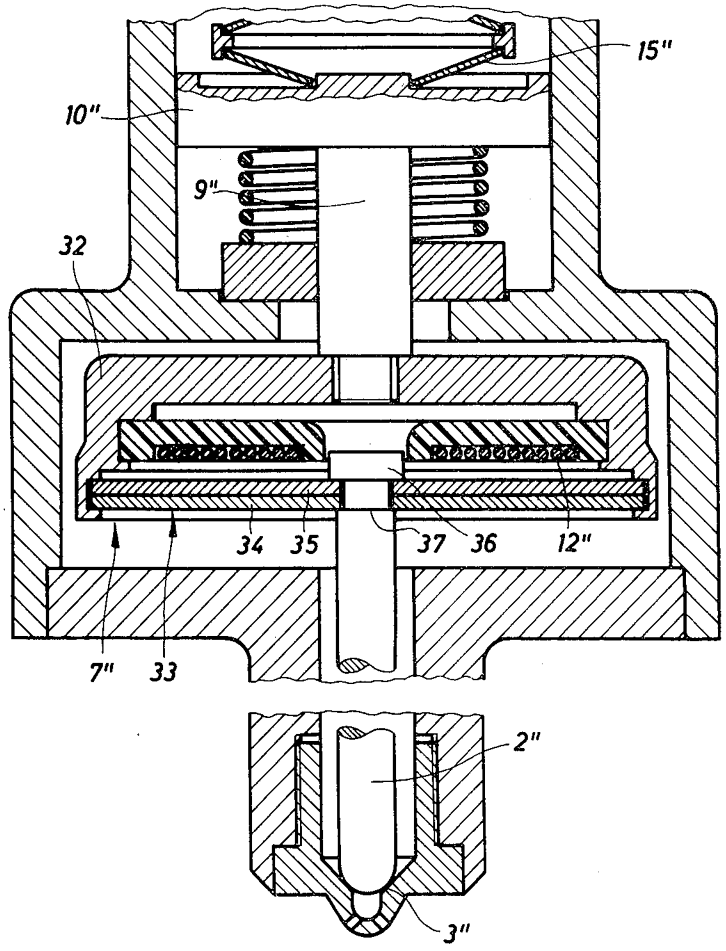
FIG. 3 shows a partial longitudinal section of a valve which is similar to FIG. 1, which has a different magnetostrictional element.

The embodiment of FIG. 3 essentially differs from those of FIGS. 1 and 2 only in that the connecting element between the valve body 2" and the damper piston 10" is constituted by a magnetostrictional element 7" rather than a magnetostrictional rod. The element 7" comprises a holder 32, which is connected to the piston rod 9" and a coil 12", which is disposed in the holder 32, and a bimetallic disc 33. The disc 32 is retained in the holder 32 and comprises a magnetostrictional plate 34 and a plate 35 of magnetically inert material rigidly connected thereto. The upper end of the valve body 2" is connected to the bimetallic disc 33 by means of a head 36 and a shoulder 37. When current flows through the coil 12", the plate 34 arches or bends upwardly because of the radial contraction of the plate 34, and hence the valve body 2" is raised from is valve seat 3". In the rest state the valve body 2" is pressed onto its valve seat 3" in the aforementioned way by the cup spring 15" via the damper piston 10", the piston rod 9", the holder 32 and the bimetallic disc 33.

The magnetostrictional rod 7 or 7' shown in FIGS. 1 and 2, may be replaced by a column composed of small piesoceramic plates, for example, columns of the type described in U.S. Pat. No. 3,055,631.

What is claimed is:

1. An electrically operable valve comprising:

a housing having a damper chamber, a fluid inlet, a fluid outlet with a valve seat and a fluid path therebetween;

a movable valve body arranged for cooperation with said valve seat, a damper piston slidable within said damper chamber, a rod for connecting said valve body to said damper piston, the movement of said rod being damped by said damper piston, said rod being of the magnetostrictional type which changes its longitudinal dimension when an electromagnetic field is applied to it for lifting said valve body off said valve seat; a spring means for urging the valve body against the valve seat; and a coil for applying said electromagnetic field to said device.

2. A valve as claimed in claim 1 wherein the valve body is slidingly connected to the rod such that the valve body is moved in the closing direction by the rod and in the opening direction by the fluid pressure when the electromagnetic field is applied to the rod.

3. A valve as claimed in claim 1 wherein said fluid is a liquid and said housing comprises passage means for connecting said chamber to said fluid inlet.

* * * * *